(12) United States Patent
Garrigan et al.

(10) Patent No.: US 6,859,018 B2
(45) Date of Patent: Feb. 22, 2005

(54) WOUND FIELD SYNCHRONOUS MACHINE CONTROL SYSTEM AND METHOD

(75) Inventors: Neil Richard Garrigan, Niskayuna, NY (US); Henry Todd Young, North East, PA (US); Bradley Allen Jones, Erie, PA (US)

(73) Assignee: General Electric Company, Niskayuna, NY (US)

( * ) Notice: Subject to any disclaimer, the term of this patent is extended or adjusted under 35 U.S.C. 154(b) by 78 days.

(21) Appl. No.: 10/429,544

(22) Filed: May 2, 2003

(65) Prior Publication Data

US 2003/0197490 A1 Oct. 23, 2003

Related U.S. Application Data

(62) Division of application No. 09/988,129, filed on Nov. 19, 2001, now Pat. No. 6,586,914.

(51) Int. Cl.[7] .......................... H02H 7/06; H02P 11/00; H02P 9/00; H02P 9/04
(52) U.S. Cl. .............................. 322/28; 322/36; 322/38
(58) Field of Search .............................. 322/28, 38, 54, 322/26, 24, 47, 36

(56) References Cited

U.S. PATENT DOCUMENTS

| 4,085,823 A | 4/1978 | Caputo et al. | |
|---|---|---|---|
| 4,218,729 A | 8/1980 | Chambers | |
| 4,468,603 A | 8/1984 | Vander Meer et al. | |
| 4,495,449 A | 1/1985 | Black et al. | |
| 4,719,361 A | 1/1988 | Brubaker | |
| 4,719,362 A | 1/1988 | Brubaker | |
| 5,027,285 A | 6/1991 | McCartney et al. | |
| 5,194,801 A * | 3/1993 | Rozman | 322/25 |
| 5,300,842 A | 4/1994 | Lyons et al. | |
| 5,325,043 A * | 6/1994 | Parro | 322/23 |
| 5,483,147 A * | 1/1996 | Ilic et al. | 322/25 |
| 5,539,651 A * | 7/1996 | Zabar et al. | 702/60 |
| 5,729,113 A | 3/1998 | Jansen et al. | |
| 6,011,357 A | 1/2000 | Gradzki et al. | |
| 6,072,302 A * | 6/2000 | Underwood et al. | 322/17 |
| 6,081,084 A | 6/2000 | Crecelius | |
| 6,175,217 B1 * | 1/2001 | Da Ponte et al. | 322/19 |
| 6,411,065 B1 * | 6/2002 | Underwood et al. | 322/20 |
| 6,486,568 B1 | 11/2002 | King et al. | |

* cited by examiner

Primary Examiner—Joseph Waks
Assistant Examiner—Julio Gonzalez
(74) Attorney, Agent, or Firm—Ann M. Agosti; Patrick K. Patnode

(57) ABSTRACT

A wound field synchronous machine control system comprises: an auxiliary winding for obtaining auxiliary AC voltage from the wound field synchronous machine; a phase controlled rectifier for rectifying the auxiliary AC voltage and supplying rectified DC voltage to the wound field synchronous machine; and a controller. The controller is configured for using a voltage signal across the auxiliary winding to obtain volt-second values of the auxiliary winding and using the volt-second values for firing angle control of switches of the phase controlled rectifier. Alternatively or additionally, the controller is configured for obtaining airgap flux values of the wound field synchronous machine and using the airgap flux values for firing angle control of switches of the phase controlled rectifier.

6 Claims, 5 Drawing Sheets

WOUND FIELD SYNCHRONOUS MACHINE CONTROL SYSTEM AND METHOD

This application is a division of application Ser. No. 09/988,129, filed Nov. 19, 2001, which issued as U.S. Pat. No. 6,586,914 and which is hereby incorporated by reference in its entirety.

BACKGROUND

The invention relates generally to field regulation of wound field synchronous machines and more particularly to off-highway vehicle alternator controls.

Self-propelled traction vehicles such as large off-highway haulage trucks include electric propulsion systems. A typical propulsion system, such as described in commonly assigned Black et al., U.S. Pat. No. 4,495,449, includes an operator-controlled throttle adapted to control the rotational speed of a prime mover which may, for example, comprise a diesel engine. An output shaft of the prime mover is drivingly coupled to a rotor of an alternating current (AC) generator (a wound field synchronous machine commonly referred to as an alternator) which has a set of three-phase main windings, an auxiliary (tertiary) winding, and a field winding. The three-phase, generally sinusoidal, alternating voltage that is generated in the main windings of the alternator is converted to direct voltage by means of an uncontrolled full-wave rectifying bridge whose output in turn is coupled either (a) to at least one armature of a respective adjustable speed direct current (DC) traction motor or (b) through an inverter to a respective alternating current (AC) traction motor. The motor rotor is coupled through suitable speed-reduction gearing to a pair of wheels located on opposite sides of the vehicle. For an AC traction system, by controlling the speed of the engine, the excitation of the alternator, and the inverter torque commands, the vehicle can be propelled (also known as "motoring") or dynamically retarded (also known as "electric braking") by the vehicle's motor or motors in either a forward or a reverse direction.

For DC traction motors, during the motoring mode of operation, the motor will rotate at a speed that depends on both the magnitude of excitation current in the motor field and the magnitude of the voltage applied to the armature windings. For AC traction motors, a more complex voltage control system is typically implemented through one set of armature windings to control field excitation and torque producing armature current.

The magnitude of the voltage applied to the armature windings is a function of both the speed at which the alternator is driven and the magnitude of excitation current in the alternator field. The alternator field excitation current is supplied by the field winding of the alternator via a single-phase, full-wave "phase controlled" rectifying bridge. Alternator field excitation current magnitude depends on the timing of periodic firing signals that are supplied to the rectifier from a firing angle control of a controller.

Present implementations for the regulation and control of the field and output voltage in wound rotor synchronous alternators are subject to parameter and signal variations. Typically the rectifier that supplies DC current to the alternator field winding comprises a thyristor such as a silicon controlled rectifier (SCR) bridge, for example. Thyristor based (or other phase control based) rectification experiences inherent non-linear behavior, and thus control presents several control challenges.

An exemplary description of rectifier circuits is provided in JOHANNES SCHAEFER, RECTIFIER CIRCUITS: THEORY AND DESIGN 1–126 (John Wiley & Sons, Inc. 1965). Conventional phase-controlled rectifier systems include techniques based on analog circuitry wherein AC voltage is rectified to form DC voltage that is applied to the alternator field winding. The average value of the DC voltage is modulated or controlled by varying the firing angle of the rectifier bridge. To accomplish the modulation, a ramp waveform that is synchronous in phase and frequency to the rectified AC voltage is compared to a small signal reference command signal. The crossing of the two signals establishes the timing of the turn-on commands that switch the rectifier bridge.

The analog circuitry of conventional techniques is inherently inflexible to modifications in that any design changes require hardware changes. Additionally, the gain of the circuitry is non-linear and highly sensitive to the operating point of the firing angle, the speed of the alternator, the level of field excitation, and the load variation. The gain is additionally sensitive to other variations in the AC voltage such as distortion due to temperature induced variation. The speed and field excitation level both change the amplitude of the AC voltage which leads directly to changes in the amount of voltage applied given a certain firing angle. In addition, the small signal gain from the reference to the field voltage is based on a time-averaged value of the discrete pulses of field voltage. This relation imposes limitations on the outer control loops in that the bandwidths must be significantly lower (typically on the order of about ten) than the pulse frequency. The inherent non-linear transfer function of the time-averaged value imposes further constraints on the outer control loops. The outer control loops must be stabilized for all operating points, which means that performance will be compromised to ensure stability at the worst case operating points. For example, the outer control loop gains and bandwidths are often set to be sufficiently low so as to accommodate the least stable operating points of the rectifier bridge to ensure overall stability.

It would therefore be desirable to have a wound field synchronous machine control system that is robust to parameter and operating point variations, insensitive to non-linearities, and readily adaptable to design modifications.

BRIEF DESCRIPTION

Briefly, in accordance with one embodiment of the present invention, a wound field synchronous machine control system comprises: an auxiliary winding for obtaining auxiliary AC voltage from the wound field synchronous machine; a phase controlled rectifier for rectifying the auxiliary AC voltage and supplying rectified DC voltage to the wound field synchronous machine; and a controller for using a voltage signal across the auxiliary winding to obtain volt-second values of the auxiliary winding and using the volt-second values for firing angle control of switches of the phase controlled rectifier.

In accordance with another embodiment of the present invention, a control system comprises: a sensor for obtaining a voltage signal across a winding; a phase controlled rectifier for rectifying AC voltage and supplying rectified DC voltage; and a controller for using the voltage signal to measure voltage integrals, and using the voltage integrals to detect zero crossings, obtain volt-second values, and synchronize firing angle control of switches of the phase controlled rectifier.

In accordance with another embodiment of the present invention, a wound field synchronous machine control system comprises: an auxiliary winding for obtaining auxiliary AC voltage from the wound field synchronous machine; a phase controlled rectifier for rectifying the auxiliary AC voltage and supplying rectified DC voltage to the wound field synchronous machine; and a controller for obtaining airgap flux values of the wound field synchronous machine and using the airgap flux values for firing angle control of switches of the phase controlled rectifier.

In accordance with another embodiment of the present invention, a flux observer for a wound field synchronous machine coupled to a direct current load is configured to use sensed machine field and direct current load currents to provide a magnetizing flux estimate.

In accordance with another embodiment of the present invention, a wound field synchronous machine control system comprises: a voltage sensor for obtaining a voltage signal from the wound field synchronous machine; a phase controlled rectifier for rectifying AC voltage and supplying rectified DC voltage to the wound field synchronous machine; a controller for using the voltage signal to obtain volt-second values, obtaining airgap flux values of the wound field synchronous machine, and using the volt-second values and airgap flux values for firing angle control of switches of the phase controlled rectifier.

In accordance with another embodiment of the present invention, a wound field synchronous machine control system comprises: AC voltage sensors for sensing AC phase voltage signals from the machine; a phase controlled rectifier for rectifying the AC phase voltages and supplying rectified DC voltage; a DC voltage sensor for sensing a DC voltage signal from the phase controlled rectifier; and a controller for selectively using the AC phase voltage signals and the DC voltage signal to estimate a DC load voltage signal, obtaining a difference between a load voltage command and the estimated DC load voltage signal, and using the difference for controlling operation of the synchronous machine.

In accordance with another embodiment of the present invention, a wound field synchronous machine control system comprises: AC voltage sensors for sensing AC phase voltage signals from the machine; a phase controlled rectifier for rectifying the AC phase voltages and supplying rectified DC voltage to a load; and a controller for using the AC phase voltage signals to estimate a DC load voltage signal, obtaining a difference between a load voltage command and the estimated DC load voltage signal, and using the difference for controlling operation of the synchronous machine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTIONS

Figure 1:
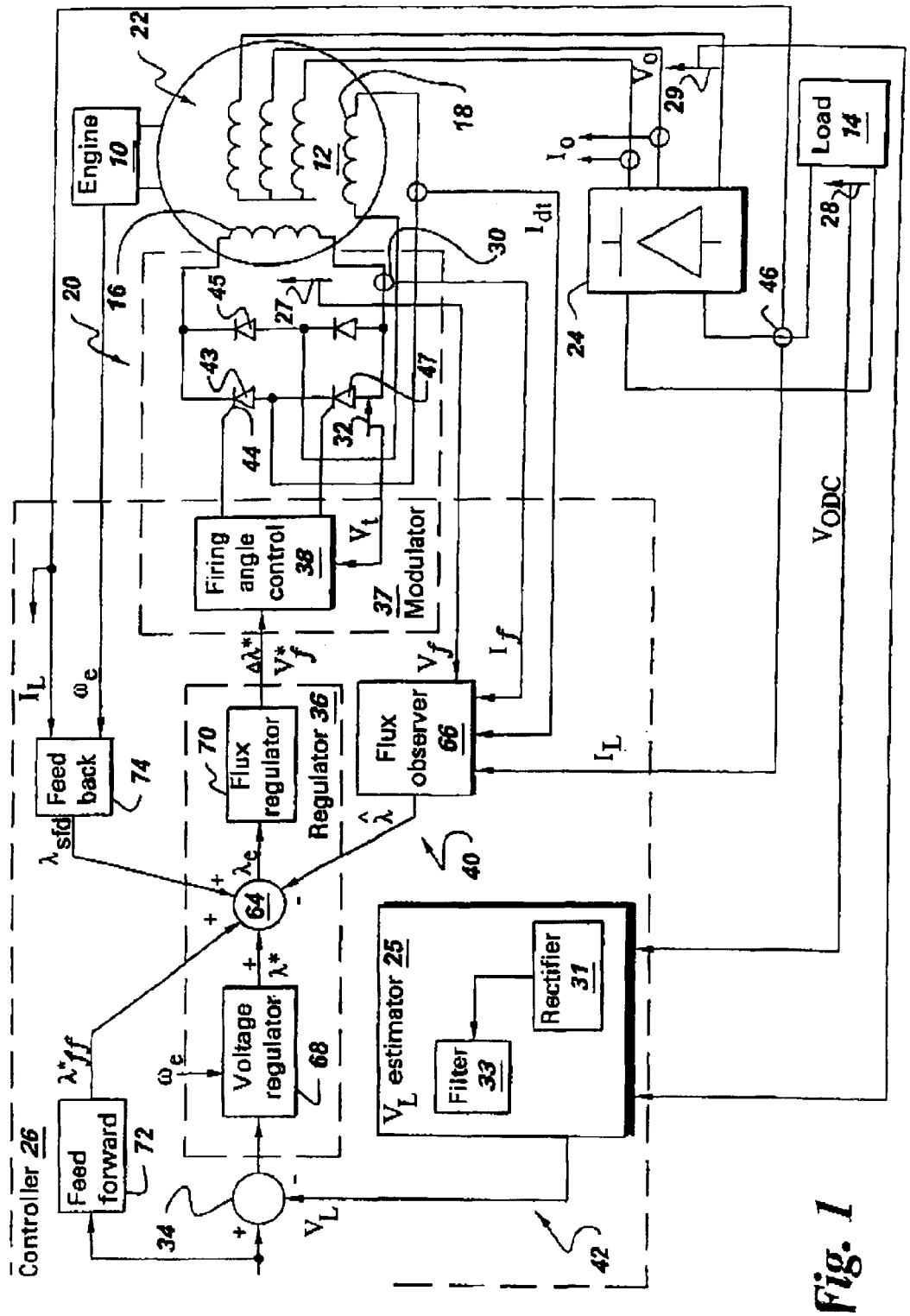
FIG. 1 is a block diagram of a control system in accordance with several embodiments of the present invention.

FIG. 1 is a block diagram of a control system 52 in accordance with several embodiments of the present invention which may be used individually or in combination. As discussed above, the control system provides a regulated DC voltage for powering a load 14 which, in one embodiment, comprises a traction vehicle's motor drive system. A wound field synchronous machine 12 such as an alternator, for example, is mechanically driven from a prime mover 10 such as an engine, over a range of speed. The machine field is electrically excited from a battery source (not shown) during start-up and electrically self-excited from an auxiliary (tertiary) winding 18 during normal operation.

A phase-controlled rectifier 20, such as a thyristor bridge, for example, is used to self-excite a machine field winding 16 by rectifying the AC auxiliary voltage and applying the resulting DC voltage to the field winding. In one embodiment, phase-controlled rectifier 20 comprises a silicon controlled rectifier bridge comprising a plurality of thyristors 43 and 47 having switches 44 and being coupled in parallel to a plurality of diodes 45. Although auxiliary winding 18 is shown as coupled to rectifier 20 for purposes of example, such coupling is not required.

An additional rectifier 24, which may comprise a full bridge three-phase diode output rectifier, for example, converts AC voltage on main stator windings 22 of the wound field synchronous machine to DC load voltage for use by load 14. If load 14 includes an AC machine requiring AC voltage, load 14 may be coupled directly to alternator 12, rectifier 24 may comprise an AC to AC rectifier, or load 14 may include a DC-AC inverter to convert the DC voltage from rectifier 24 to AC voltage for the AC machine.

The control system regulates the load voltage by sensing or otherwise obtaining or calculating appropriate parameters and using a controller 26. Depending on the application, the load voltage signal may be obtained using a DC load voltage sensor 28, AC load voltage sensors 29, or a combination of DC and AC load voltage sensors.

In embodiments where the load can regenerate and reverse bias the rectifier 24, the control system 26 cannot be regulated on the basis of the DC load voltage ($V_{ODG}$) sensed by sensor 28. In these embodiments, a voltage estimator 25 can be used to estimate a load Voltage $V_L$ from the AC phase-to-phase voltages. In one embodiment, the voltage estimator comprises a full wave rectifier 31 for rectifying the three phase voltages and a low pass filter 33 for low pass filtering the rectified voltage and applying a correction factor based on load current. In a more specific embodiment, rectifier 31 is designed to compute the maximum instantaneous difference between any two of the three AC phase voltages. Regardless of the embodiment selected for DC voltage estimation from AC phase voltages, the DC voltage estimator can use the DC voltage estimate based on the AC phase voltages exclusively, switch between the estimate and the sensed DC voltage as desired, or otherwise use a combination of the two voltage estimates. In one embodiment, for example, the DC voltage signal is used except that whenever the DC voltage signal is greater than the AC derived voltage estimate, the AC derived voltage estimate is used.

The resulting DC load voltage signal (estimate $V_L$) is supplied to a summation element 34 along with a load voltage command $V_L^*$. Regulator 36 uses the difference (error) between $V_L^*$ and $V_L$ from summation element 34 to provide a small signal field voltage command $V_f^*$ (representing a scaled representation of the average value of the field voltage command) or a volt-second integral command $\Delta\lambda^*$ to a firing angle control 38 which controls phase-controlled rectifier 20 by turning on and off switches 44 and drives the error to zero through an outer control loop 42. Firing angle control 38 and rectifier 20 are sometimes collectively referred to as a modulator 37. Modulator 37, although shown as a voltage modulator for purposes of example, may alternately comprise a flux modulator.

Controller 26 may comprise analog, digital, or a combination of analog and digital electronics. In one embodiment of the present invention, control algorithms are implemented in controller 26 to enhance regulation of DC load voltage. In this embodiment, the analog-based phase-controlled rectifier electronics of conventional control systems are replaced with analog and digital electronics including a microprocessor with associated software and programmable logic. Analog electronics, while not required, remain useful, particularly in the firing angle control 38 for high power embodiments.

In a more specific embodiment of the present invention, the wound field synchronous machine 12 control system 52 comprises: auxiliary winding 18 for obtaining auxiliary AC voltage from the wound field synchronous machine; phase controlled rectifier 20 for rectifying the auxiliary AC voltage and supplying rectified DC voltage to the wound field synchronous machine; and controller 26 for using a voltage signal (which preferably comprises a voltage waveform) across the auxiliary winding to obtain volt-second values of the auxiliary winding and for using the volt-second values for firing angle control of switches 44 of the phase controlled rectifier.

Volt-seconds represent an integration of voltage over time. For example, one volt-second is equivalent to one volt applied for one second. Volt-seconds relate to magnetic flux in that a "Weber" is a unit of magnetic flux whose decrease to zero when linked with a single turn induces in the turn a voltage with a time integral of one volt-second.

Controller 26 can advantageously use the last available (most recently obtained) volt-second values for directly calculating the next firing angle time and thus account for variations in the volt-seconds available due to distortion, prime mover speed changes, airgap flux changes, and other variations such as those due to temperature changes. Use of volt-second calculations results in an accurate modulation function across the phase-controlled rectifier that is robust to operating point and parameter variations and that overcomes some difficulties with inherent non-linearities of conventional ramp comparison control.

To measure the last volt-seconds from auxiliary winding voltage sensor 32 and to synchronize commutation timing of phase-controlled rectifier 20, it is useful to implement a zero crossing detection algorithm on the AC auxiliary voltage signal (waveform). In one embodiment, the control system is configured to use the auxiliary voltage signal to measure voltage integrals, and use the voltage integrals to detect zero crossings, obtain the volt-second values, and synchronize the firing angle control of the switches. In a more specific embodiment, the voltage integrals are measured in positive and negative directions (that is, the present and last volt-seconds). In these embodiments, zero crossings can be detected in a robust manner with minimal phase delay. In contrast, conventional zero crossing detection embodiments use simple voltage reference comparisons that can be subject to noise glitches and distortion that can cause unwanted miss-fires of switches 44 and subsequent voltage transient distortion on the DC load voltage.

Figure 2:
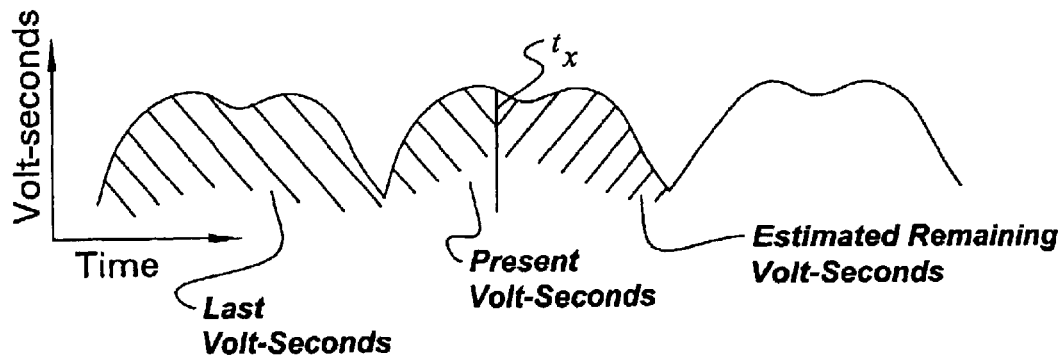
FIG. 2 is a graph illustrating volt-seconds on an auxiliary winding with respect to time.
Figure 3:
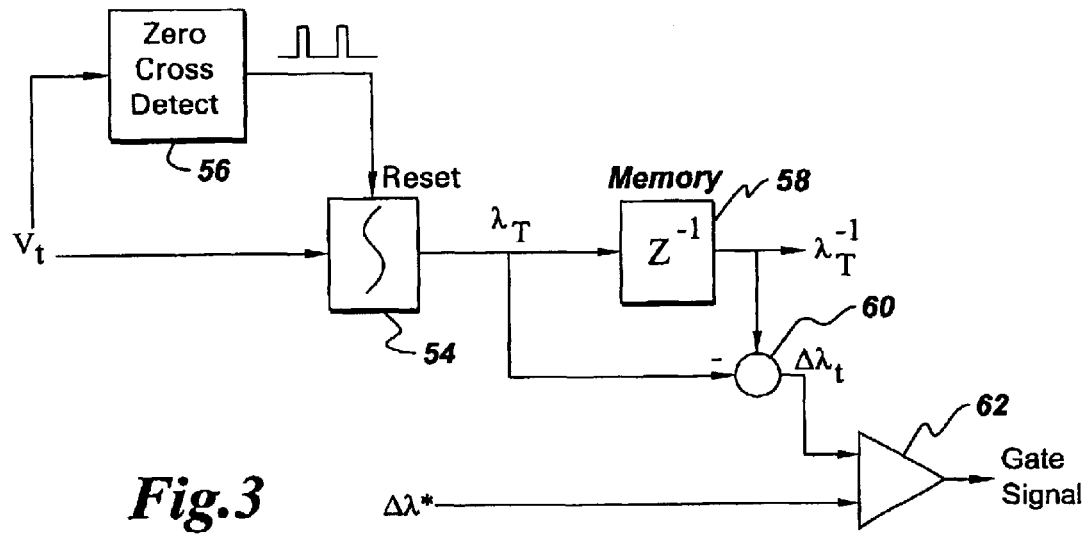
FIG. 3 is a block diagram illustrating a process for using the auxiliary winding voltage to control gating signals in accordance with an embodiment of the present invention.
Figure 4:
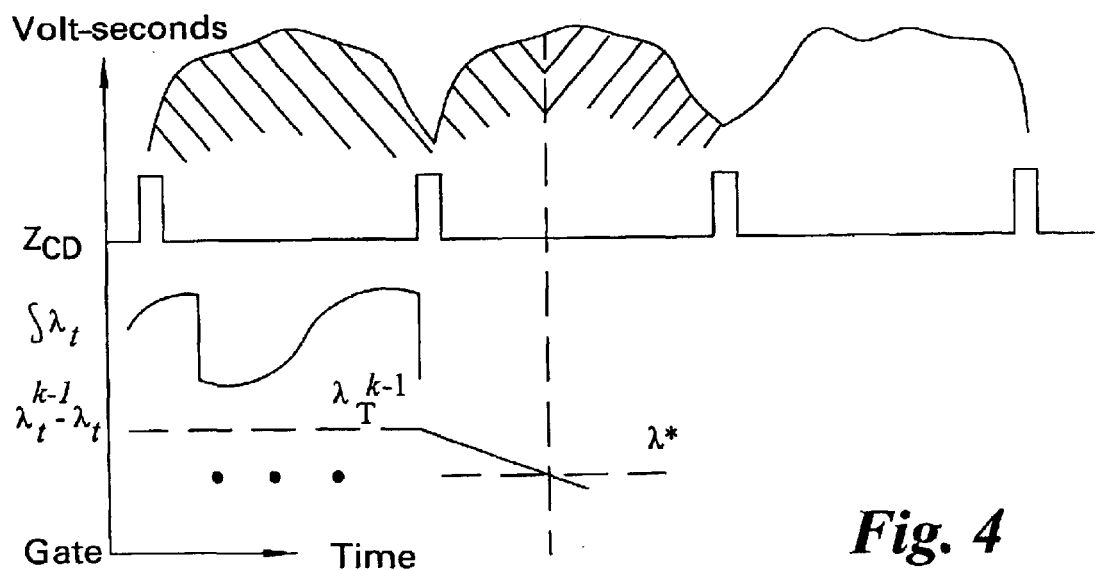
FIG. 4 is a graph illustrating waveforms applicable to the block diagram of FIG. 3.

A more specific embodiment for determining the firing angle from the previous value of volt-seconds measured on the auxiliary winding is described as follows with respect to FIGS. 2–5. FIG. 2 is a graph illustrating volt-seconds on auxiliary winding 18 with respect to time wherein time $t_x$ represents the time in the present volt-seconds dividing the present volt-seconds that have passed from the estimated remaining volt-seconds. FIG. 3 is a block diagram illustrating a process for using the auxiliary winding voltage $V_t$ to control gating signals to control firing angles of switches 44, and FIG. 4 is a graph illustrating pertinent waveforms. Typically the controls for the embodiment of FIG. 3 are situated within firing angle control 38 of FIG. 1.

The total volt-seconds for each rectified half cycle of the auxiliary voltage waveform is determined by using an integrator 54 (FIG. 3). A timing signal (ZCD) from zero cross detection block 56 that is synchronized with the zero-crossings of the auxiliary waveform is used to synchronize and reset the volt-second integrals each cycle. More specifically, the timing signal is synchronized to the auxiliary voltage waveform zero crossings to reset integrator 54.

At the start of each half cycle, the value of integrator 54 ($\lambda_t$) is stored in memory 58 as the last volt-second integral ($\lambda_t^{-1}$). Then integrator 54 is reset to zero and integration of the next half cycle begins. The commanded integral ($\Delta\lambda^*$) of regulator 36 is then compared at comparator 62 with a signal that is equal to the last volt-second integral minus the present volt-second integral ($\Delta\lambda_t = \lambda_t^{-1} - \lambda_t$ as obtained by summation element 60). When $\Delta\lambda^*$ equals $\Delta\lambda_t$, the remaining volt-seconds to occur are substantially equal to the commanded value, and the thyristors are then gated. In other words, the present volt-seconds $\lambda_t$ are tracked until is it is estimated based upon the last volt-second. integral $\lambda_t^{-1}$ that the remaining volt-seconds $\alpha\lambda_t$ will give the commanded value $\Delta\lambda^*$.

As long as variations in the auxiliary waveform are slow or small over the period of a half cycle, the consecutive half cycle volt-second integrals will be approximately equal, and the algorithms will work well. Very rapid variations in the auxiliary waveforms over the period of a half cycle will introduce errors in the applied volt-second as compared to the command. It is expected that such errors will typically be small and can be compensated for by outer control loop 42 voltage regulator 68 (which in one embodiment, comprises a proportional integral controller for integrating the error from subtractor 34 and generating a flux command $\lambda^*$). Calculation and gating of the thyristors based on a measured value of the most recent volt-seconds available minimizes the sensitivity of accuracy to auxiliary waveform distortion and to variations in speed and flux level. In addition, direct calculation of the firing angle and gating in this manner ensures that the commanded flux is achieved in no more than about one half electrical cycle of time.

The zero crossing technique of block 56 may include using hysteresis to provide immunity to noise and false zero crossing detection. Using hysterisis, however, involves a tradeoff in that using hysterisis adds phase delay which can introduce error in the last and present volt-second calculation.

In another embodiment, zero crossing detection is combined with last volt-second calculation. In this embodiment, two integrations are used to calculate the last volt-second, one for each polarity of the signal. When a potential zero crossing is detected, the opposite polarity integration begins. If the voltage maintains the new polarity until the integral reaches a hysteresis threshold, then the new polarity is declared, and the old polarity integration is reset to zero (ready to start at the next crossing). If the voltage reverts back to the old polarity before the hysterisis threshold is reached, it is assumed that the potential zero crossing was due to noise and not an actual zero crossing, the new integration is reset to zero (ready for another potential crossing) and the old polarity integration is continued. During the transition states before the new polarity is declared, firing of the thyristors is suppressed. This embodiment is useful because no phase delay or error in the last volt-second integral is introduced. The only performance limitation is that switches in rectifier 20 cannot be fired during the transition state. The integral threshold can be adjusted based on frequency and amplitude of the auxiliary voltage signal to provide constant hysterisis angle of the waveform. The integrators for the zero crossing detector and for the last volt-second do not have to be the same. In one implementation, for example, the zero crossing detector is performed in a first microcontroller (not shown) of controller 26 and the last volt-second integration is done in a Field Programmable Gate Array (FPGA) (not shown) of controller 26.

Figure 5:
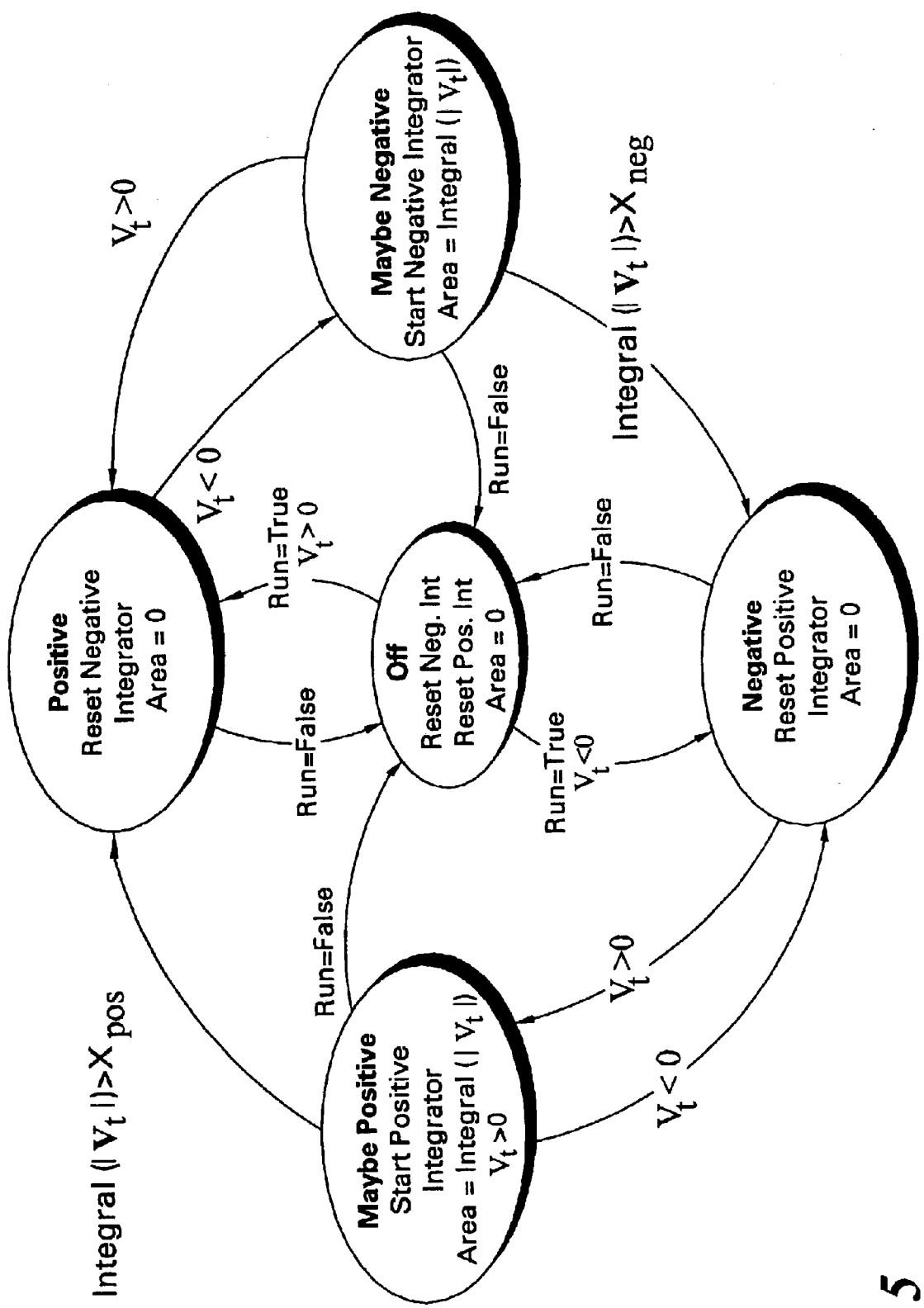
FIG. 5 is a state diagram illustrating states in an example embodiment for zero crossing detection in accordance with an embodiment of the present invention.

As shown in FIG. 5, in one embodiment the auxiliary voltage signal has five polarity states: 1) Off—system is not enabled to run; 2) Positive—voltage is positive and firing of a positive thyristor (shown as thyristor 43 in FIG. 1) is enabled; 3) Maybe negative: voltage is negative, but voltage integral has not exceeded threshold—thyristor firing is disabled; 4) Negative—voltage is negative, and firing of a negative thyristor (shown as thyristor 47 in FIG. 1) is enabled; and 5) Maybe Positive—voltage is positive, but the integral of the voltage has not exceeded the threshold to declare positive state—firing is disabled. In this embodiment, the negative volt-second integration is reset to zero in the positive state; the positive volt-second integration is reset to zero in the negative state; the negative volt-second integral is copied into the last volt-second buffer on the transition from maybe positive to positive; and the positive volt-second integral is copied in to the last volt-second buffer on the transition from maybe negative to negative.

Referring again to FIG. 1, in another embodiment of the present invention, controller 26 of wound field synchronous machine 12 control system 52 is configured for obtaining airgap flux (magnetizing flux common to all terminals) values of the wound field synchronous machine and using the airgap flux values for firing angle control of switches 44 of phase controlled rectifier 20.

Controlling airgap flux directly as an inner control loop 40 variable (as compared to conventional techniques of controlling field current) is advantageous because the DC load voltage $V_L$ is more closely (mathematically and physically) related to airgap flux than to field current. The open circuit AC output voltage $V_O$ is directly proportional to the product of airgap flux and rotational speed (Faraday's law). The rectified load voltage ($V_L$) differs from the open circuit voltage ($V_O$) due to output impedance (i.e. leakage reactance and winding resistance), rectification losses and armature reaction. The effects of output impedance and rectification are small effects. The armature reaction is due to a changing level of airgap flux resulting from the magnetizing component of the load current. The armature reaction does not disturb the relationship of proportionality to airgap flux and can be compensated for in the estimation of airgap flux level.

Another advantage of controlling airgap flux directly as an inner control loop 40 variable is that the applied variable of control can have fixed time duration of field voltage measured in terms of volt-seconds or flux (because field excitation with voltage over time is substantially proportional to airgap flux). When the field winding is excited from a source of voltage, the voltage is applied over fixed controlled intervals of time such that the variable of control is really volt-seconds or flux. Together these two properties make the use of an inner flux regulation control loop advantageous as compared to an inter field current regulation control loop. Although field current is conveniently measured and typically the inner control loop variable, the field current has two limitations. First the field current is magnetically non-linear with flux, and second the field current is only one of the magnetizing components of current associated with the airgap flux.

In one embodiment, inner control loop 40 comprises: a flux observer 66 for receiving current values and estimating a value of feedback flux; a summation element 64 to subtract an estimated value of feedback flux from a commanded value of flux; a regulator 36 (modulator); and a controllable DC voltage source driving the field winding of the machine. In one embodiment, last volt-second thyristor control is used as described above. Alternatively, conventional thyristor controls may be used. The field excitation source may comprise either the auxiliary winding or another external or internally derived source. The regulation algorithm may comprise a dead-beat type of control as discussed below or a traditional type of control such as proportional integral (PI) control.

Overall operation of the inner control loop 40 is as follows. The flux command $\lambda^*$ (generated by voltage regulator 68) is compared to the estimated value of airgap flux $\hat{\lambda}$ (from flux observer 66) to generate a flux error which is driven to zero by flux regulator 70. The flux error is processed in flux regulator 70 according to a flux regulation algorithm into a voltage ($V_f^*$) or volt-second ($\Delta\lambda^*$) command that is synthesized and applied to the field terminals through firing angle control 38. Flux regulator 70 may comprise a conventional proportional integral controller or a "dead-beat" type flux controller as discussed below.

To obtain the estimated airgap flux $\hat{\lambda}$ value, flux observer 66 of controller 26 can be configured to use current feedback sensor measurements. Magnetizing current $i_m$ can be expressed as a function of field current $i_f$, direct axis stator current $i_{ds}$, and direct axis auxiliary current $i_{dt}$:

$$i_m = i_f + i_{ds} + i_{dt}.$$

Magnetizing flux is a non-linear algebraic function of the magnetizing current:

$$\lambda_m = f(i_m).$$

However, using a magnetizing current for flux observation can be inconvenient because such a technique requires measurement of two phases of the AC current $i_0$ (to obtain $i_{ds}$) and subsequent resolution of the magnetizing component. This entails the standard d-q synchronous reference frame coordinate transformations where the three phase AC variables are transformed into two phase variables of a reference frame that is synchronous with the machine rotating flux. It is desirable to avoid these operations to eliminate the required sensors and the processing algorithms.

Figure 6:
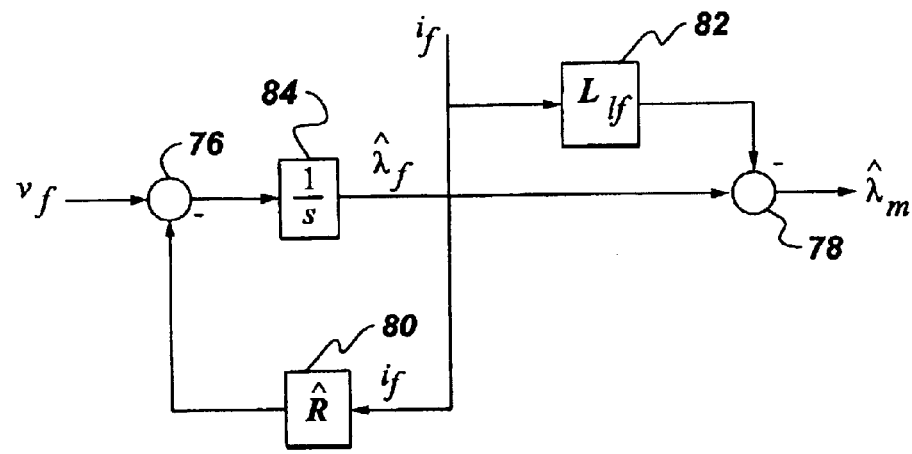
FIGS. 6–9 are block diagrams of airgap flux estimation models in accordance with several embodiments of the present invention.

In one embodiment, as shown in FIG. 6, field voltage $v_f$ (obtainable, for example, from sensor 27 of FIG. 1) and field current $i_f$ (obtainable, for example, from sensor 30 of FIG. 1) are used to estimate the airgap flux. Per Faraday's Law, $v_f = i_f R_f + d\lambda_f/dt$ (or $\lambda_f = \int v_f - i_f R_f$), and $\lambda_m = \lambda_f - i_f L_{if}$ wherein $R_f$ represents field resistance (which can be estimated and represented as $\hat{R}$), $\lambda_f$ represents field flux, and $L_{if}$ represents field leakage inductance. Combining the above two equations yields:

$\hat{\lambda}_m = \int v_f - i_f \hat{R} - i_f L_{if}$ as represented in FIG. 6 by subtractors 76 and 78, multipliers 80 and 82, and integrator 84.

Figure 7:
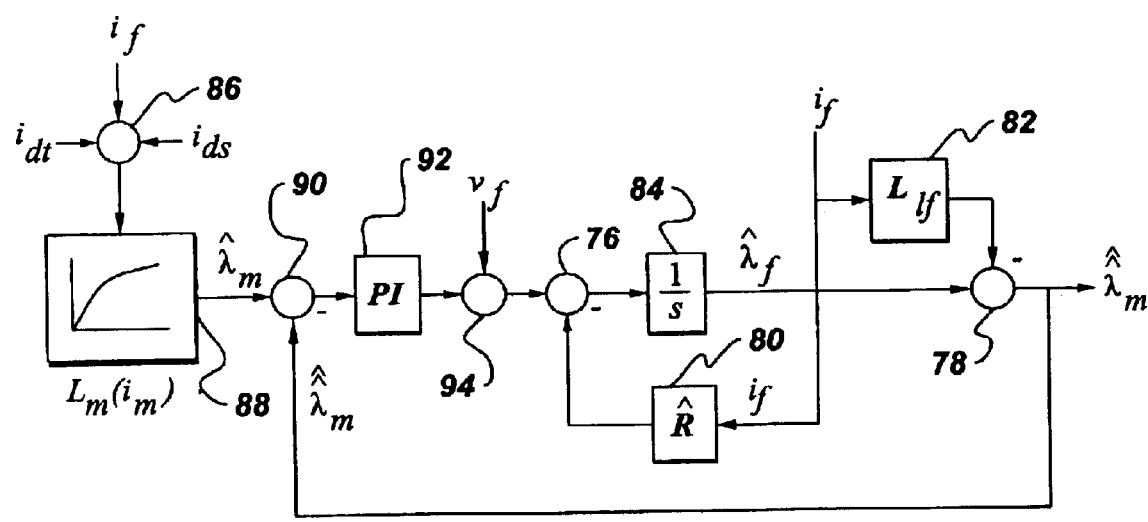

In another embodiment, as shown in FIG. 7, the magnetizing current model and field voltage and current model are combined (with subtractor 90, proportional integral controller 92, and adder 94) to form a closed loop flux observer that provides a hybrid estimate of flux $\lambda_m$ that is based on the current model at steady state and at low frequencies (on an order of magnitude lower than the fundamental frequency of machine 12 of FIG. 1, for example) and on the voltage model at higher frequencies. Intermediate frequencies can be a blend of the two models. The voltage model gives rapid response to dynamic perturbations in voltage, but lacks steady state stability due to drift of integrator 84 and lower accuracy in resistance values at low frequencies. The current model (represented by adder 86) provides steady state and low frequency stability. Function 88 provides the no load magnetizing flux estimate from the magnetizing current model.

In some embodiments, such as many off highway vehicle alternator embodiments, direct axis stator current $i_{ds}$ and direct axis auxiliary current $i_{dt}$ are not readily obtainable. One current measurement that is typically readily available is DC load current $i_L$. However, there is no obvious reflection of DC load current to AC side d-axis magnetizing current.

Load saturation curves are often plotted for alternators. In such plots the rectified DC output voltage is measured as a function of DC load current with field current as a running parameter. In one embodiment, load saturation type data is recorded with magnetizing flux (rather than output voltage) as a function of field current and load current. In this embodiment, to obtain the data, the field winding will be separately excited from a controlled source, and the auxiliary winding open circuit, having no current, will provide a good measure of the airgap induced voltage (which is due to the magnetizing flux). Knowing that the airgap induced voltage is a derivative of the magnetizing flux, and running at constant frequency, an RMS (root mean squared) equivalent of the magnetizing flux can be recorded and calculated from the open circuited auxiliary voltage. Although the auxiliary magnetizing effect is omitted from the analysis, the effect is expected to be negligible or to be compensated for by outer control loop 42 (FIG. 1).

Figure 8:
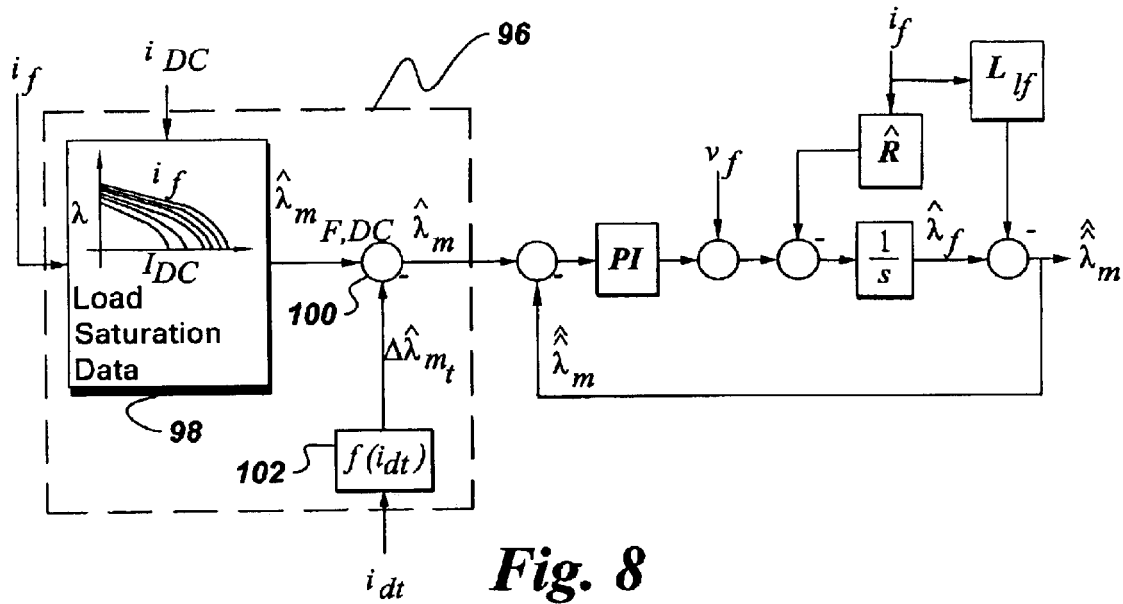

FIG. 8 illustrates an embodiment wherein a current model 96 comprises a load saturation model 98 that uses field current $i_f$ and load voltage $i_{DC}$ to provide a magnetizing flux estimate $\hat{\lambda}_{m_{FDC}}$ which, if desired, can be compensated for at summation block 100 by subtracting an auxiliary current correction factor obtained from correction block 102 to obtain a more accurate magnetizing flux estimate $\hat{\lambda}_m$. Current model 96 may be used independently or, as shown in FIG. 8 for purposes of example, in combination with the voltage model discussed in FIGS. 6–7.

Load saturation model 98 may comprise a look up table, a fitted curve, or a mathematical function, for example. Because load saturation curves have parabolic shapes, the curves can be conveniently represented as parabolic functions where the DC load current is the independent variable and the field current is an independent coefficient parameter.

In one embodiment, a linear function is fit for the load current and the load current x-intercepts $I_{DC_0}$ (line of zero flux) and the field current $I_F$:

$I_{DC_0}(I_F) = k_{DC_0} I_F$, wherein $k_{DC_0}$, represents the slope of a line that best fits the zero flux points (x-intercepts) of DC current with respect to the field current. Additionally, a function is fit or a look-up table is generated to represent the machine's magnetization curve $\lambda_{m_0}(I_F)$ with respect to load current. Then the relation between field current and load current and modulating flux combinations can be calculated as:

$$a(I_F) = a(I_{DC_0}, \lambda_{m_0}) = \frac{I_{DC_0}(I_F)}{[\lambda_{m_0}(I_F)]^2}$$

Wherein $\alpha$ represents a load curve shape constant for a respective field current $I_F$. In other words, each field current has an associated magnetizing flux and load current curve with a respective associated load curve shape constant $\alpha$. In one example, the magnetizing flux and load current curves comprise parabolic curves with the load current for a given curve equaling the respective load current x-intercept minus the product of $\alpha$ and the square of the magnetizing flux.

The magnetizing flux can be calculated as follows:

$$\lambda_m(I_F) = \sqrt{\frac{I_{DC_0}(I_F) - I_{DC}}{a(I_{DC_0}, \lambda_{m_0})}}.$$

Figure 9:
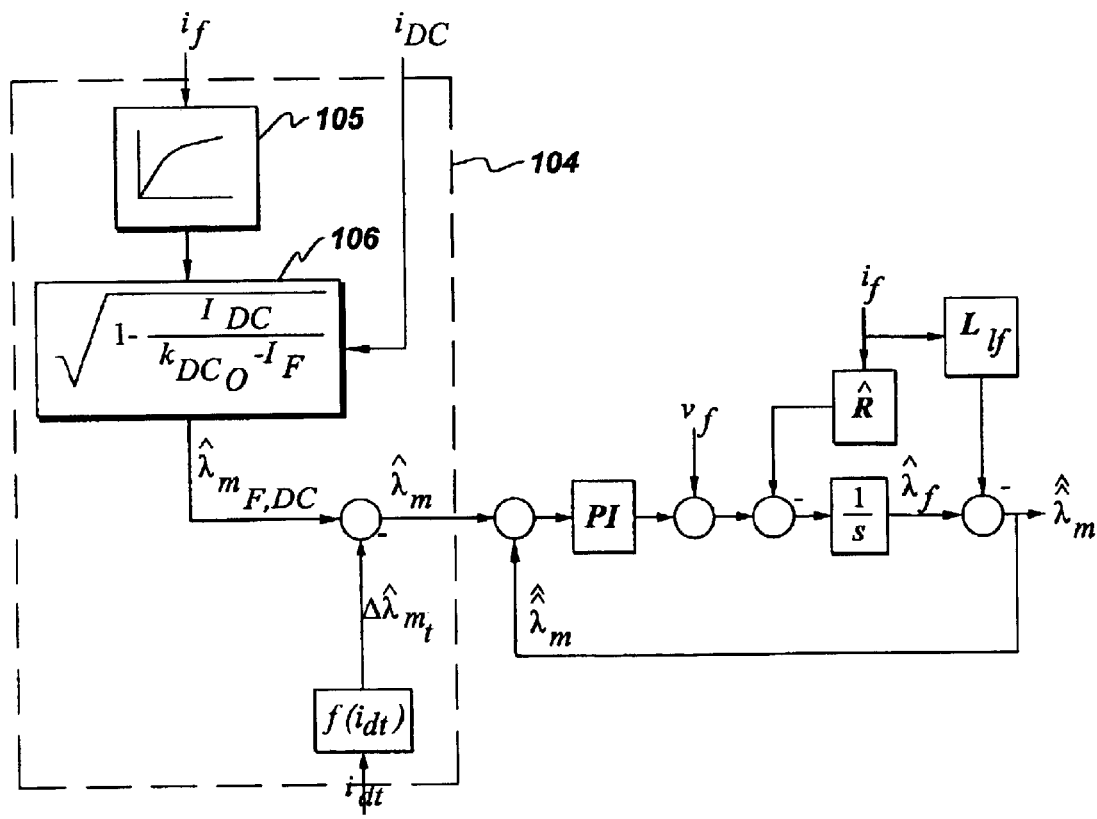

The equation for $\lambda_m(I_F)$ can be rewritten by substituting the above equations for $I_{DC_0}(I_F)$ and $a(I_{DC_0}, \lambda_{m_0})$ as:

$$\lambda_m(I_F) = \lambda_{m_0}(I_F)\sqrt{1 - \frac{I_{DC}}{k_{DC_0} I_F}}$$

and is represented for purposes of example in FIG. 9 as a flux function 106 of a current model 104 (with function 105 provides the no load magnetizing flux estimate from the field current model). Current model 104 may be used independently or, as shown in FIG. 9 for purposes of example, in combination with the voltage model discussed in FIGS. 6–7.

Referring again to FIG. 1, in one embodiment, the flux regulation algorithm of flux regulator 70 is implemented using. dead-beat flux control. This method of control directly uses the last volt-second based calculation of firing angles. Dead-beat control is a terminology used in discrete time control systems wherein the output of a regulated system is controlled such that the commanded value is achieved in a single time step of the discrete time system. In other words the command is "dead-on" in one time "beat" of the controller. In this embodiment, the flux is controlled such that the command is approximately achieved in one half of an electrical cycle of the machine. The discrete time constraint here of one half electrical cycle stems from the available conduction interval of the phase controlled rectifier excited from the auxiliary winding. The discrete time interval varies with machine speed.

More specifically, in this embodiment of the present invention, controller 26 of wound field synchronous machine 12 control system 52 is configured for using the voltage signal across the auxiliary winding to obtain volt-second values of the auxiliary winding, obtaining airgap flux values, and using the volt-second values and the airgap flux values for firing angle control of switches 44 of the phase controlled rectifier.

In the dead-beat flux control, the flux error, being in the units of and equivalent to volt-seconds, is used to directly calculate the firing angle as described in the last volt-second thyristor control description. Alternatively a conservative design may use a scaled (percentage of unity) flux error to determine the firing angle. It is useful for the firing angle to be selected such that the volt-seconds applied over the conduction interval exactly equal the flux error such that at the end of the half cycle the commanded flux is achieved.

The main advantages of the dead-beat flux control is the direct calculation algorithm and simplicity of implementation and the rapid and stable response behavior. An alternative approach based on time-averaged control would employ a regulator that would regulate the value of flux measured and averaged over many cycles of the discrete time interval. Time averaged control is widely understood in pulse width modulation control and thyristor control. A limitation of such control methods is that the time averaged nature inherently requires many cycles and dictates limited response times. Instabilities occur when the bandwidths are pushed higher and approach the discrete time constraint. The dead-beat control pushes the response time to the fastest possible limit and simultaneously ensures stability with direct calculation of modulation level.

In another embodiment of the present invention, state feedback control 74 is used to decouple load current ($I_L$) and engine speed ($\omega_e$). Changes in the operating point such as in electrical load or in speed result in changes in the output voltage representing undesired disturbances. Closed loop feedback control in outer control loop 42 ultimately modifies the flux level to compensate for such disturbances and to maintain the output voltage at the commanded reference value. Such control action takes time to occur as the signals circulate through the entire feedback control system and is subject to the control loop dynamic response.

It would be desirable to bypass outer control loop 42 and more quickly translate the required flux changes through inner control loop 40 to decouple the disturbances. Any residual error not compensated via the inner control loop can then be compensated with the outer control loop. However it can be shown to very effectively minimize the disturbance effects of variations in load and speed on the output voltage.

In one embodiment, for example, state feedback control 74 receives values of engine speed and load current and uses an analytical model or a lookup table to determine what change in flux is needed to compensate for change in speed and load current and to generate an appropriate state feedback decoupling flux signal $\lambda_{sfd}$ to be included at summation element 64.

In another embodiment of the present invention, the engine speed is alternatively or additionally fed directly back into voltage regulator 68, and voltage regulator 68 uses the engine speed, in combination with the error from 34 to generate the flux command $\lambda^*$. This can be accomplished by using the engine speed to adjust a gain schedule of the voltage regulator.

In another embodiment of the present invention, command feedforward control 72 can be used to track variations in the load voltage command $V_L^*$. Normal operation of the system may require that the output voltage be changed according to some predetermined operating conditions such as speed or mode of operation. During these times, the load voltage command $V_L^*$ is changed. It is desired to have the load voltage $V_L$ track the command voltage as accurately as possible.

Without feedforward compensation, voltage regulator will detect an error as the command is changed and will drive outer control loop 42 in such a fashion as to correct the error and regain tracking of the load voltage with the load voltage command. This response is subject to the dynamics of the outer control loop which again may be somewhat slow. A faster and preferred response can be achieved if the required flux change necessary to accommodate the changing command is predetermined from the command and fed forward to the inner control loop at summation element 64. In this case the inner control loop is much faster and can more rapidly respond to the command without waiting for outer control loop. Again compensation of residual error can be accomplished by the outer control loop. The result is an improved response to variations in the commanded reference value. In one embodiment, for example, feedforward control 72 receives the load voltage command and uses an analytical model or a lookup table to determine what change in flux is needed to compensate for any changes in the load voltage command and to generate an appropriate feedforward flux command $\lambda_{ff}$ to be included at summation element 64.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A wound field synchronous machine control system comprising:
   (a) alternating current (AC) voltage sensors for sensing AC phase voltage signals from the machine;
   (b) a rectifier for rectifying the AC phase voltages and supplying rectified DC voltage to a load; and
   (c) a controller for using the AC phase voltage signals to estimate a DC load voltage signal by computing a maximum instantaneous difference between any two of the AC phase voltages, obtaining a difference between a load voltage command and the estimated DC load voltage signal, and using the difference for controlling operation of the synchronous machine.

2. The system of claim 1 wherein the controller further comprises a low pass configured for low pass filtering the maximum instantaneous difference.

3. A wound field synchronous machine control method comprising:
   (a) sensing AC phase voltage signals from the machine;
   (b) rectifying the AC phase voltages and supplying rectified DC voltage to a load;
   (c) using the AC phase voltage signals to estimate a DC load voltage signal by computing a maximum instantaneous difference between any two of the AC phase voltages;
   (d) obtaining a difference between a load voltage command and the estimated DC load voltage signal; and
   (e) using the difference for controlling operation of the synchronous machine.

4. The method of claim 3 wherein using the AC phase voltage signals to estimate the DC load voltage signal further comprises low pass filtering the maximum instantaneous difference.

5. A wound field synchronous machine control system comprising;
   alternating current (AC) voltage sensors for sensing AC phase voltage signals from the machine; and
   a controller for using the AC phase voltage signals to estimate a DC load voltage signal by computing a maximum instantaneous difference between any two of the AC phase voltages.

6. The system of claim 5 wherein the controller further comprises a low pass filter configured for low pass filtering the maximum instantaneous difference.

* * * * *